United States Patent
Matsubara et al.

(10) Patent No.: US 8,041,917 B2
(45) Date of Patent: Oct. 18, 2011

(54) MANAGING SERVER, POOL ADDING METHOD AND COMPUTER SYSTEM

(75) Inventors: Keisuke Matsubara, Fujisawa (JP); Nobuo Beniyama, Yokohama (JP); Hiroshi Nojima, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 642 days.

(21) Appl. No.: 12/172,455

(22) Filed: Jul. 14, 2008

(65) Prior Publication Data

US 2009/0292895 A1 Nov. 26, 2009

(30) Foreign Application Priority Data

May 26, 2008 (JP) .................................. 2008-137055

(51) Int. Cl.
- G06F 12/00 (2006.01)
- G06F 13/00 (2006.01)
- G06F 13/28 (2006.01)
- G06F 9/26 (2006.01)
- G06F 9/34 (2006.01)

(52) U.S. Cl. .................... 711/170; 711/111; 711/203

(58) Field of Classification Search .................. 711/111, 711/170, 203

See application file for complete search history.

(56) References Cited

U.S. PATENT DOCUMENTS

| 6,823,442 | B1 | 11/2004 | Cameron |
| 2006/0095706 | A1 | 5/2006 | Aoyama |
| 2007/0016746 | A1* | 1/2007 | Kano ............................ 711/165 |
| 2007/0255925 | A1 | 11/2007 | Serizawa et al. |
| 2007/0266218 | A1 | 11/2007 | Achiwa et al. |

FOREIGN PATENT DOCUMENTS

| JP | 2005-011316 | 1/2005 |
| JP | 2006-127143 | 5/2006 |
| JP | 2007-304794 | 11/2007 |

* cited by examiner

*Primary Examiner* — Jared Rutz
*Assistant Examiner* — Ryan Bertram
(74) *Attorney, Agent, or Firm* — Foley & Lardner LLP

(57) ABSTRACT

In a computer system, even when the virtual storage capacity of pools is increased, it is possible to keep the availability of each pool at least at a desired level. The managing server compares a reference value beforehand stored therein with an evaluation value of availability which represents a degree of resistivity against destruction, the degree being derived by use of physical configuration information which is obtained from the controller and which is associated with the pool; and determines necessity of addition of an element to the pool if the availability evaluation value exceeds the reference value and indicates the addition of the element to the pool to the storage apparatus.

11 Claims, 19 Drawing Sheets

FIG. 4

| POOL NAME | POOL VOLUME NAME | CAPACITY |
|---|---|---|
| POOL 1 | p_vol 1 | 50T |
| POOL 1 | p_vol 2 | 50T |
| POOL 1 | p_vol 3 | 100T |
| : | : | : |

FIG. 5

| POOL VOLUME NAME | Idev NAME | Idev SIZE | DKA NAME | DKA PORT NAME | ARRAY GROUP NAME |
|---|---|---|---|---|---|
| p_vol 1 | Idev 1 | 50T | dka 1 | port 1 | AG 1 |
| p_vol 2 | Idev 2 | 50T | dka 1 | port 1 | AG 1 |
| p_vol 3 | Idev 3 | 100T | dka 2 | port 2 | AG 2 |
| : | : | : | : | : | : |

FIG. 6

| NO. OF Idev | NO. OF DKA | NO. OF PORTS |
|---|---|---|
| 1000 | 6 | 12 |

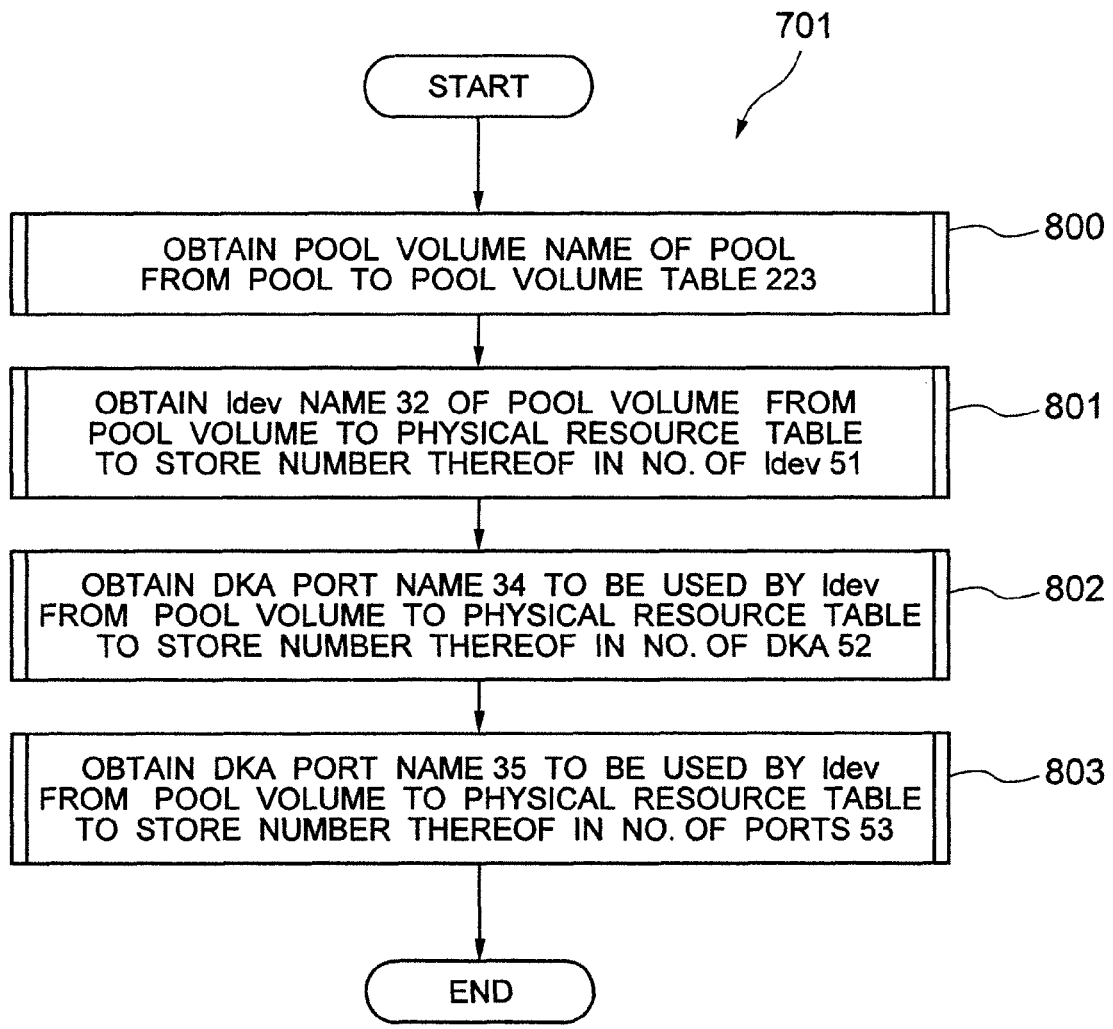

FIG.13

| POOL VOLUME NAME | Idev NAME | Idev SIZE | DKA NAME | DKA PORT NAME | ARRAY GROUP NAME | EXTERNAL STORAGE NAME | PORT NAME ON EXTERNAL STORAGE SIDE |
|---|---|---|---|---|---|---|---|
| p_vol 21 | Idev 21 | 50T | edka 1 | edka_port 1 | eAG 1 | ext 1 | eport 1 |
| p_vol 22 | Idev 22 | 50T | edka 1 | edka_port 2 | eAG 1 | ext 1 | eport 1 |
| . . | . . | . . | . . | . . | . . | . . | . . |

FIG.17

| NO. OF Idev | NO. OF DKA | NO. OF PORTS | NO. OF EXTERNAL STORAGES | NO. OF EXTERNAL CONNECTION PORTS |
|---|---|---|---|---|
| 32 | 4 | 8 | 6 | 12 |

FIG.19

| POOL NAME | THIN PROVISIONING VOLUME NAME | VIRTUAL CAPACITY | USED CAPACITY |
|---|---|---|---|
| POOL 1 | v_vol 1 | 50T | 25T |
| POOL 1 | v_vol 2 | 50T | 25T |
| POOL 1 | v_vol 3 | 100T | 25T |
| POOL 1 | v_vol 4 | 100T | 25T |

| NO. OF Idev | NO. OF DKA | NO. OF PORTS |
|---|---|---|
| 32 | 4 | 8 |

×3  ×3  ×3

(b)

| NO. OF Idev | NO. OF DKA | NO. OF PORTS |
|---|---|---|
| 96 | 12 | 25 |

MANAGING SERVER, POOL ADDING METHOD AND COMPUTER SYSTEM

CLAIM OF PRIORITY

The present application claims priority from Japanese application JP2008-137055 filed on May 26, 2008, the content of which is hereby incorporated by reference into this application.

BACKGROUND OF THE INVENTION

The present invention relates to a computer system including a storage system to which a storage virtualizing technique is applied.

Recently, there has been broadly installed a computer system in which one or more external storage apparatuses are connected to one or more host computers or hosts via a Storage Area Network (SAN) such that the hosts use or share a large-capacity storage apparatus including the external storage apparatuses. Such computer system is advantageous in expandability, that is, a storage resource (e.g., an external storage apparatus) and a computer resource (e.g., a host) can be easily added, deleted, or replaced. A storage apparatus configured in the form of Redundant Arrays of Inexpensive Disks (RAID) is generally used as an external storage apparatus to be connected to the SAN. In this regard, a storage apparatus (also referred to simply as a storage) indicates a large-sized storage apparatus including disk devices and the like.

Recently, in association with expanded and complicated storage environments due to increase in data of firms and companies, there has been increasingly and widely employed "Thin Provisioning" which is a virtualizing technique of a storage system to simplify the operation and management of the storage system and to consolidate the storage environments.

The thin provisioning is a function to provide (present) a host with a thin provisioning volume for which the storage system has not a storage area (not corresponding to an actual area, i.e., an actual physical or logical storage area) to establish a correspondence between the thin provisioning volume and a set of virtual storage areas called a pool. When a host accesses the thin provisioning volume, the storage system allocates an actual storage area to an area of the thin provisioning volume.

For example, JP-A-2005-11316 describes a technique in which when a host carries out an operation to write data in a thin provisioning volume of a storage, an actual storage area is first allocated to an associated area of the thin provisioning volume. U.S. Pat. No. 6,823,442 describes a technique in which a thin provisioning volume to be accessed by a host is disposed in a storage system to allocate a physical storage area to the thin provisioning volume.

Since a plurality of thin provisioning volumes may correspond to one pool, the system is capable of effectively use virtual storage areas of the pool. Specifically, it is possible that the storage system beforehand arranges thin provisioning volumes virtually having a large capacity such that new virtual storage areas are added to the pool depending on the state of utilization of the pool to thereby increase the virtual storage capacity. On this occasion, it is not required in the initial stage to prepare or to arrange all hardware resources or storage media corresponding to the virtual storage areas, but it is only necessary to add such required hardware resources later according to necessity. This leads to, for example, an advantage that inexpensive hardware resources or storage media are later purchased for installation thereof according to necessity.

SUMMARY OF THE INVENTION

Due to development of storage integration by virtualization technology such as thin provisioning, virtual volume in a pool tends to increase. However the availability (a degree of resistivity against destruction) at each of pool and further more the availability of each thin provisioning volume decrease because the number of physical device or element (e.g. port, external storage apparatus) for which the pool depends may increase when a virtual volume capacity of a pool increase.

It is therefore object to present invention, which has been devised to solve the above problems, to provide to keep the availability of each pool at least at a desired level.

To solve the problem according to one aspect of the present invention, a managing server for managing a storage apparatus comprising a plurality of storage devices and a controller connected via a communication path to a host computer for controlling input and output operations of data for each of the storage devices in response to a request from the host computer. The storage apparatus comprises at least one virtual volume to be accessed by the host computer and at least one pool assigned to the virtual volume. The pool being a set of logical volumes as virtual storage areas corresponds to the plural storage devices. The managing server compares a reference value beforehand stored therein with an evaluation value of availability which represents a degree of resistivity against destruction and the degree being derived by use of physical configuration information which is obtained from the controller and which is associated with the pool. The managing server determines necessity of addition of an element to the pool if the availability evaluation value exceeds the reference value and indicates the addition of the element to the pool to the storage apparatus.

BRIEF DESCRIPTION OF THE DRAWINGS

FIG. 4 is a diagram showing an example of a pool to pool volume table in the first embodiment, the table storing pools and pool volumes with a correspondence therebetween.

FIG. 5 is a diagram showing an example of a pool volume to physical resource table in the first embodiment, the table storing pool volumes and physical resources with a correspondence therebetween.

FIG. 6 is a diagram showing an example of reference values of the first embodiment.

FIG. 8 is a flowchart showing an example of processing to be executed by the managing server of the first embodiment to derive an availability evaluation value.

FIG. 9 is a diagram showing an example of an availability evaluation value table of the first embodiment.

FIG. 13 is a diagram showing an example of a pool volume to external connection resource table of the second embodiment, the table storing pool volumes and external connection resources with a correspondence therebetween.

FIG. 17 is a diagram showing an example of an availability evaluation value table of the second embodiment.

FIG. 19 is a diagram showing an example of a thin provisioning volume to pool table of the third embodiment, the table storing thin provisioning volumes and pools with a correspondence therebetween.

FIG. 22 is a diagram showing an example of prediction of availability evaluation values in the third embodiment of a computer system.

DESCRIPTION OF THE EMBODIMENTS

Figure 1:
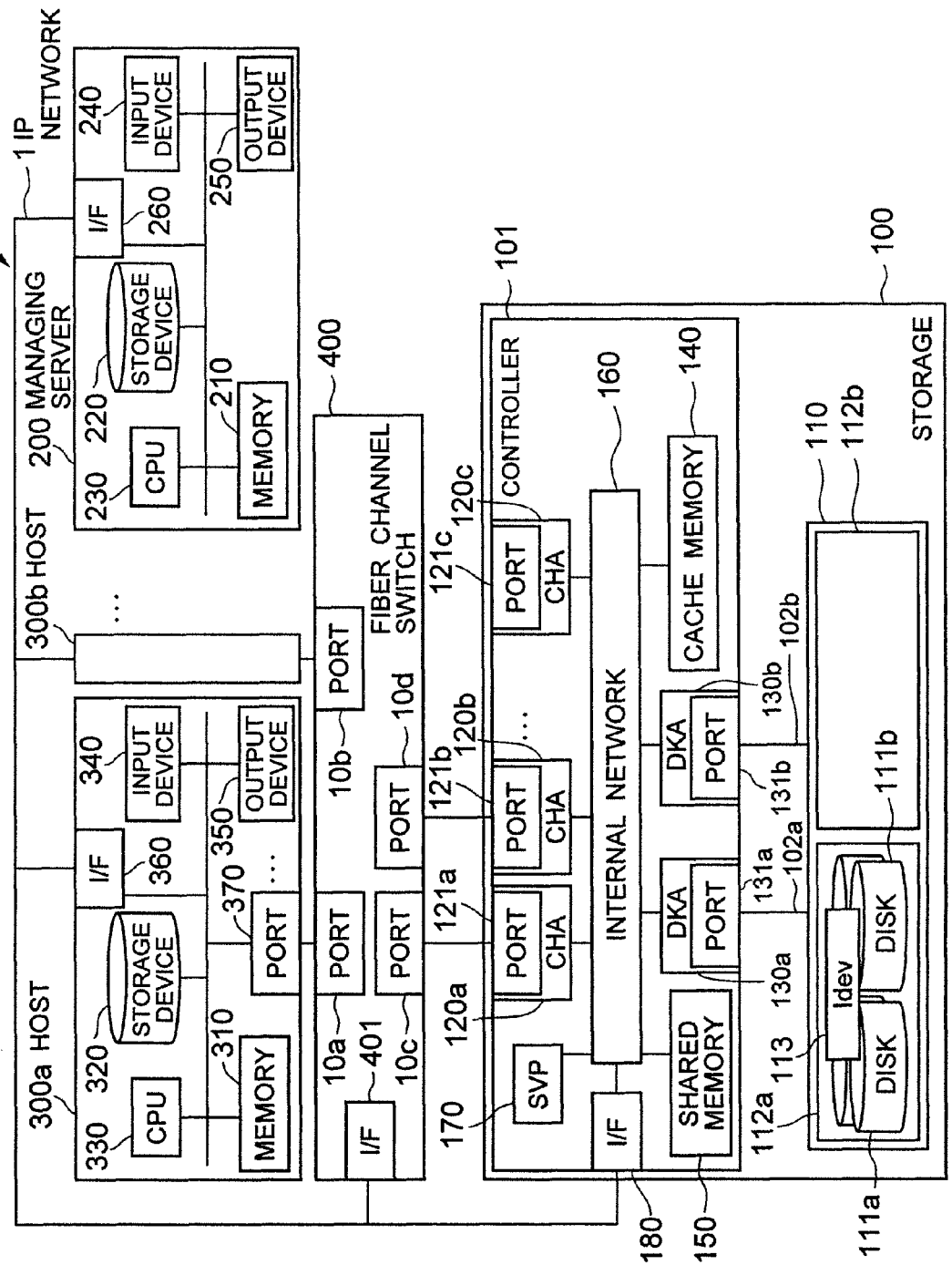
FIG. 1 is a block diagram showing an example of a hardware configuration a computer system in a first embodiment according to the present invention.

Description will now be given of first to third embodiments of the present invention by referring to the drawings.

First Embodiment

Referring to FIGS. 1 to 10, description will be given of the first embodiment.

FIG. 1 shows in a block diagram an example of a hardware configuration a computer system in the first embodiment.

In the first embodiment, the computer system S comprehensively indicates one or more hosts 300 (300a and 300b; this also applies to other configurations) and includes a fibre channel switch 400, a managing server 200, and a storage 100.

The host 300 is a computer including a Central Processing Unit (CPU) 330, a memory 310, a storage device 320, an input device 340, an output device 350, an interface controller (I/F) 360, and a port 370.

The CPU 330 is a processor which reads software from the memory 310 and then executes the software. When the CPU 330 executes the software items such as an operating system and application programs, predetermined functions are implemented.

The memory 310 stores the software items such as an operating system and application programs read from the storage device 320.

The storage device 320 is, for example, a disk drive or a magneto-optical disk drive to store therein the software items such as an operating system and application programs.

The input device 340 includes, for example, a keyboard and a mouse. The input device 340 receives input items from, for example, a host manager.

The output device 350 is, for example, a display and outputs therefrom information indicated by the CPU 330.

The interface controller 360 is connected to an Internet Protocol (IP) network 1. The host 300 may include a plurality of interface controllers 360.

The port 370 is connected to a port 10 of the fibre channel switch 400. It is also possible that the host 300 includes one or more host bus adapters (HBA) and one HBA includes one or more ports 370.

The fibre channel switch 400 includes an interface controller (I/F) 401 and a plurality of ports 10 to configure a Storage Area Network (SAN) to mutually connect the host 300 and the storage 100 to each other.

The managing server 200 is a computer including a CPU 230, a memory 210, an input device 240, an output device 250, and an interface controller (I/F) 260.

The CPU 230 is a processor which reads software from the memory 210 to execute the software. When the CPU 230 executes storage managing software and the like, there are achieved or implemented predetermined functions of, for example, the operation, maintenance, and management of the overall computer system S.

The memory 210 stores the storage managing software and the like read from the storage device 220.

The storage device 220 is, for example, a disk drive or a magneto-optical disk drive to store therein the storage managing software and the like.

The input device 240, the output device 250, and the interface controller 260 are similar respectively to the input device 340, the output device 350, and the interface controller 360, and hence description thereof will be avoided.

When the CPU 230 executes the storage managing software, the managing server 200 collects, via the IP network 1 and the interface controller 260 from each constituent component of the computer system S, information of the configuration, a resource utilization ratio, performance monitor information, a log of failure, and the like. The managing server 200 sends the collected information items to the output device, e.g., the output device 250 to present the information items to the storage manager. On the other hand, the managing server 200 receives an indication from the storage manager via the input device 240, e.g., a keyboard and a mouse and feeds the received indication for the operation and/or maintenance via the interface controller 260 to associated constituent components.

The storage 100 is a data storage such as a disk array subsystem including a controller 101 and a storage section 110.

The controller 101 controls operation of the storage 100. The controller 101 includes, for example, a plurality of channel adapters (CHA) 120, a plurality of disk adapters (DKA) 130, a cache memory 140, a shared memory 150, an internal network 160, a Service Processor (SVP) 170, and an interface controller (I/F) 180.

The channel adapters 120 controls data communication with the host 300. Each channel adapter 120 may be a computer including, for example, a microprocessor, a memory, a protocol chip, and a data transfer chip. Each channel adapter 120 includes a port 121. Each port 121 is assigned with a network address, e.g., an IP address and a WorldWide Name (WWN).

The disk adapter 130 controls data communication with the storage section 110. Like the channel adapter 120, the disk adapter 130 is implemented in the form of a computer including constituent elements such as a microprocessor and a memory. The disk adapter 130 includes a port 131 connected via a communication network 102 to the storage section 110.

The cache memory 140 stores therein, for example, write data received from the host 300 and read data read from the storage section 110. The shared memory 150 stores therein various control and configuration information items required to control operation of the storage 100. It is also possible to integrally install the cache memory 140 and the shared memory 150 in one memory package.

The internal network 160 is configured as a unit, for example, like a crossbar switch. The internal network 160 connects each channel adapter 120 and each disk adapter 130 to the cache memory 140 and the shared memory 150.

The service processor 170 is connected via a Local Area Network (LAN) or the like (the internal network 160) to the channel adapters 120 and the interface controller 180. The service processor 170 periodically or non-periodically collects information items such as various statuses in the storage 100 and produces an alarm signal, an analysis result, and the like using the collected information items.

The interface controller 180 is connected to the IP network 1. The service processor 170 is also connectable via the interface controller 180 to the managing server 200. Hence, the managing server 200 can acquire information of an internal state of the storage 100 via the IP network 1 and the service processor 170. The user may change the setting of the storage 100 from the managing server 200 via the service processor 170.

The storage section 110 includes, for example, a plurality of disk drives 111 (storage devices) connected in an array to each other. The disk drive 111 may include any kind of various storage devices, e.g., a hard disk drive, a semiconductor memory drive, an optical disk drive, a magneto-optical disk drive, or a magnetic tape drive.

If hard disk drives are used, there may be employed various kinds of hard disk drives, e.g., a Fibre Channel (FC) disk drive, a Serial AT Attachment (SATA) disk drive, or a Small Computer System Interface (SCSI) disk drive. The storage section 110 may include different kinds of storage devices.

For example, a predetermined number of disk drives 111, e.g., four or eight disk drives 111 configure one group. This is called an array group 112. Each disk drive 111 of an array group 112 provides a physical storage area, and the array group 112 provides a set of physical storage areas.

In the physical storage areas of the array group 112, one or more logical volumes (logical devices (ldev) 113) can be set. Each logical device (ldev) 113 is allocated to the port 121 of the channel adapter 120 to be accessed by the host 300. The host accesses data stored in the storage 100, by use of the port 121 corresponding to the ldev 113. Data written by the host 300 is finally stored in the disk drive 111.

When the configuration of the storage 100 is changed by the storage managing software from the managing server or is changed in response to an indication from the storage manager or when the configuration is changed through a failure or automatic change, the service processor 170 updates associated information of the configuration in the shared memory 150. The service processor 170 notifies the event of the configuration update to the managing server 200.

Figure 2:
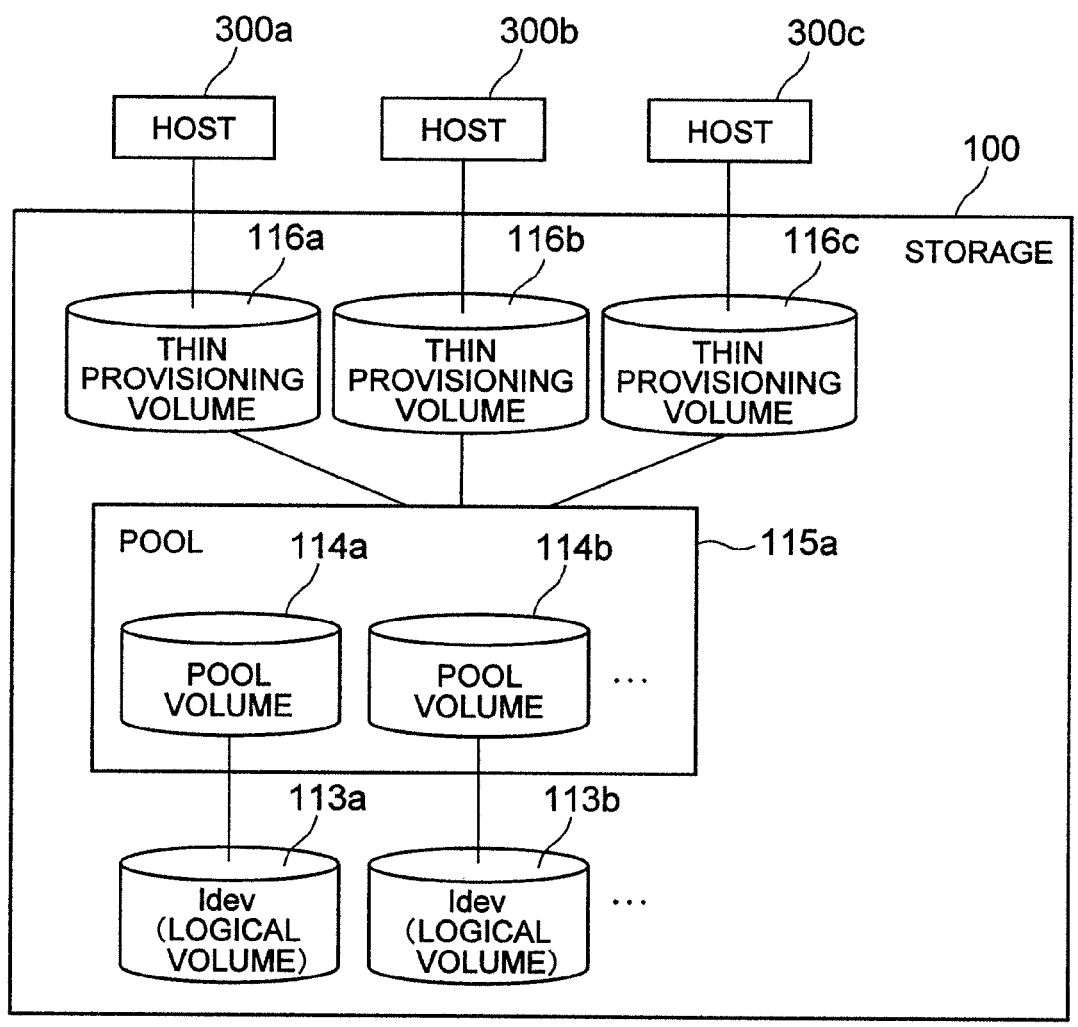
FIG. 2 is a diagram showing an example of a logical configuration of the computer system in the first embodiment.

FIG. 2 shows in a block diagram an example of logical structure of the computer system in the first embodiment. In the storage 100, one or more logical devices (ldev) 113 are beforehand registered as pool volumes 114 to a pool 115. The storage 100 obtains thin provisioning volumes (virtual volumes) 116 as virtual volumes (storage areas) from the pool 115 and allocates the volumes to the host 300. The host 300 accesses each of the thin provisioning volumes 116. An area accessed in the accessed volume 116 corresponds to a predetermined storage area of the associated logical device (ldev) 113 in the pool 115.

The storage area is dynamically allocated to the thin provisioning volume 116 by the controller 101 in response to the access from the host 300. For the unused areas of the volume 116, no physical storage device is consumed (used). Therefore, by beforehand preparing in the storage system (storage 100) a thin provisioning volume having a large capacity for the host 300, it is possible that according to a state of allocation of storage areas of the pool 115 to the volume 116, a new logical device 113 is gradually added later to the pool 115.

Next, description will be given of an evaluation value of availability of a pool in the first embodiment. As described above, availability is in general a degree of resistivity against destruction, and is specifically a ratio (e.g., 999/1000) of a period of time in which a system is available, e.g. 999 hours (in consideration of one hour in which the system is not available due to failure) to a period of time in which the system is expectedly available (e.g., 1000 hours). In the first embodiment, the availability evaluation value of a pool is defined as below. Assuming that probability of occurrence of failure in a pool increases as the number of constituent elements of the pool becomes larger, the number of constituent elements is defined as the availability evaluation value of a pool for each kind of constituent elements of the pool. That is, for each constituent element type of the pool, the larger the number of the elements is, the lower is the availability of the pool. Although the evaluation value of the pool availability is obtained according to the number of such constituent elements in the first embodiment, it is also possible to determine that the pool availability evaluation value is the sum of mean failure time of the respective constituent elements of the pool. The sum of mean failure periods of time is a reciprocal of the total obtained by adding the reciprocals of the respective mean failure periods of time to each other.

Next, description will be given of a software configuration of the managing server 200 in the first embodiment.

Figure 3:
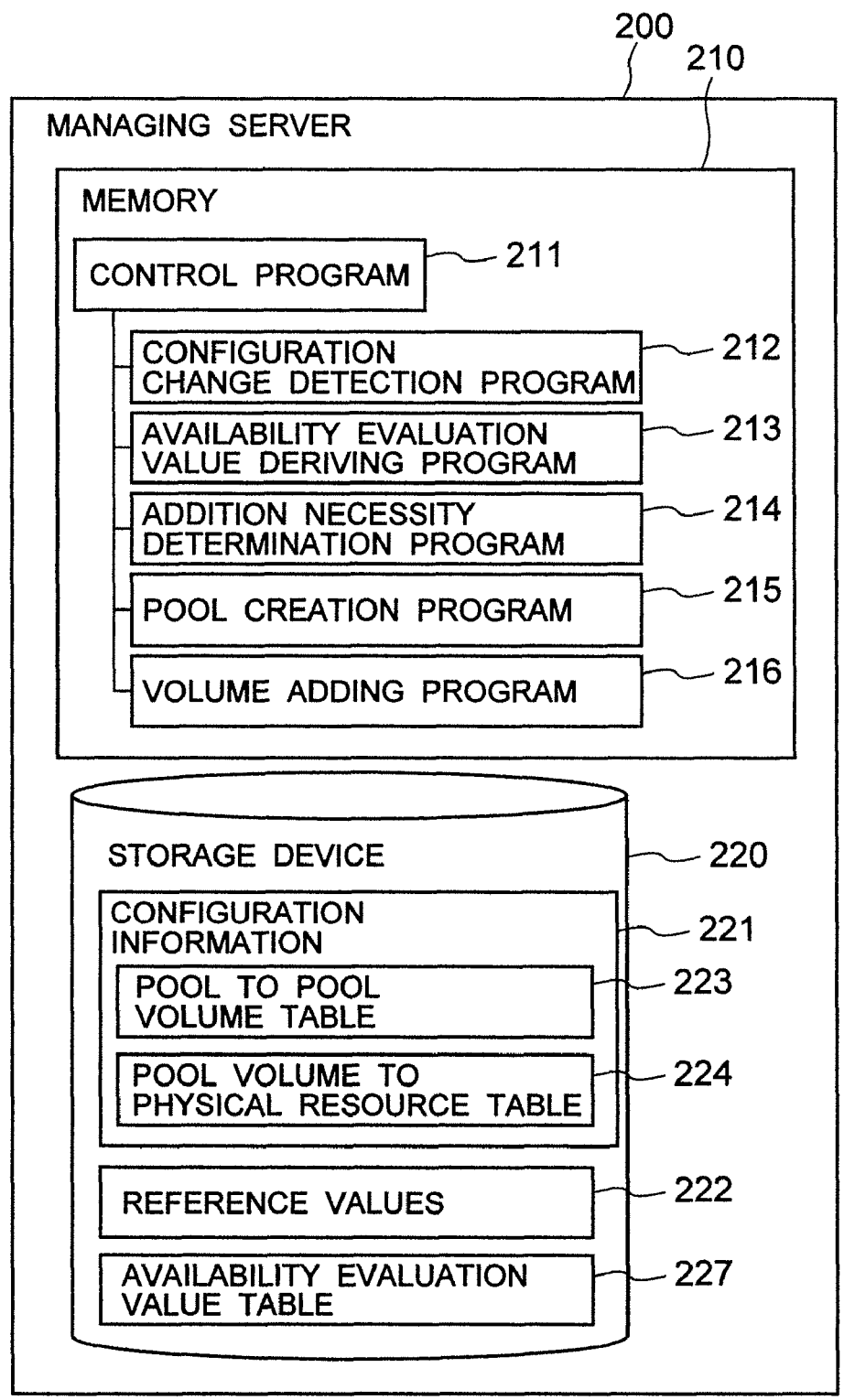
FIG. 3 is a diagram showing an example of configuration information and programs for storage control processing stored in a memory and a storage device of a managing server in the first embodiment.

FIG. 3 shows in a diagram an example of control information and programs for storage control processing stored in the storage device 220 and the memory 210 of the managing server 200 of the first embodiment.

The storage device 220 stores configuration information 221, reference values 222, and an availability evaluation value table 227. The availability evaluation value table 227 may be stored in the configuration information 221. The configuration information 221 collected from the storage 100 includes a pool to pool volume table 223 and a pool volume to physical resource table 224.

The memory 210 stores a control program 211, a configuration change detection program 212, an availability evaluation value deriving program 213, an addition necessity determination program 214, a pool creation program 215, and a volume adding program 216. These programs are to be executed by the CPU 230. Processings of these programs will be described later in detail.

Description will now be given of the control information (configuration information). First, the pool to pool volume table 223 will be described.

FIG. 4 shows an example of a pool to pool volume table 223 of the first embodiment in a diagram. The table 223 keeps therein, for each pool, a set of information items including a pool volume name 22 of the pool and capacity 23 of an associated pool volume.

The pool name field 21 stores a name assigned by the service processor 170 to identify the pool. The pool name may be any value to uniquely identify the pool, for example, a character string.

The pool volume name field 22 stores a name assigned by the service processor 170 to identify the pool volume.

The capacity field 23 stores information indicating a capacity (e.g., 50 terabytes (T)) of the volume identified by the pool volume name filed 22.

Next, description will be given of the pool volume to physical resource table 224.

FIG. 5 shows in a diagram an example of the pool volume to physical resource table 224 of the first embodiment. The table 224 keeps therein, for each pool volume, a set of information items including a pool volume name 31, a logical device (ldev) name 32, an ldev size 33, a Disk Adapter (DKA) name 34, a DKA port name 35, and an array group name 36.

The pool volume name field 31 stores a unique value in the storage 100 assigned to the pool volume by the service processor 170 of the storage 100.

The ldev name field 32 stores a name of the ldev 113 assigned to the pool volume by the service processor 170.

The ldev size filed 33 stores information indicating capacity of the ldev 113 indicated by the ldev name 32.

The DKA name field 34 stores a name of the DKA 130 connected to the array group 112.

The DKA port name 35 stores a name of a port 131 of the DKA 130 connected to the array group 112.

The array group name field 36 stores a name of an array group assigned to the array group 112.

Next, the reference value field 222 will be described.

FIG. 6 is a diagram to explain an example of the contents of the reference value field 222. The field 222 keeps therein a set of information items including the number of ldev 41, the number of DKA 42, and the number of ports 43.

The no. of ldev field 41 stores the maximum number of ldev 113 contained in one pool.

The no. of DKA field 42 stores the maximum number of DKA 130 contained in one pool.

The no. of port field 43 stores the maximum number of ports 130 contained in one pool.

It is assumed in the first embodiment that the storage manager sets the respective values of the reference value field 222. However, it is also possible that the storage managing software of the managing server 200 sets the values of the reference value field 222 on the basis of the pool configuration information gathered at occurrence of failure in which virtual volumes became unavailable in the past.

Next, description will be given of the availability evaluation value table 227.

FIG. 9 shows an example of the availability evaluation value table 227. The table 227 keeps, for each pool volume, a set of information items including the number of ldev 51, the number of DKA 52, and the number of ports 53, which will be described in detail later by referring to FIG. 8.

Returning to FIG. 3, description will be given of programs stored in the memory 210 of the managing server 200. Although these programs are executed by the CPU 230, each program will be described as the subject which conducts operation for simplicity of explanation.

The control program 211 receives an indication from the input device 240 and is activated to control sequences of processings which are executed by the configuration change detection program 212, the availability evaluation value deriving program 213, the addition necessity determination program 214, the pool creation program 215, and the volume adding program 216.

Figure 7:
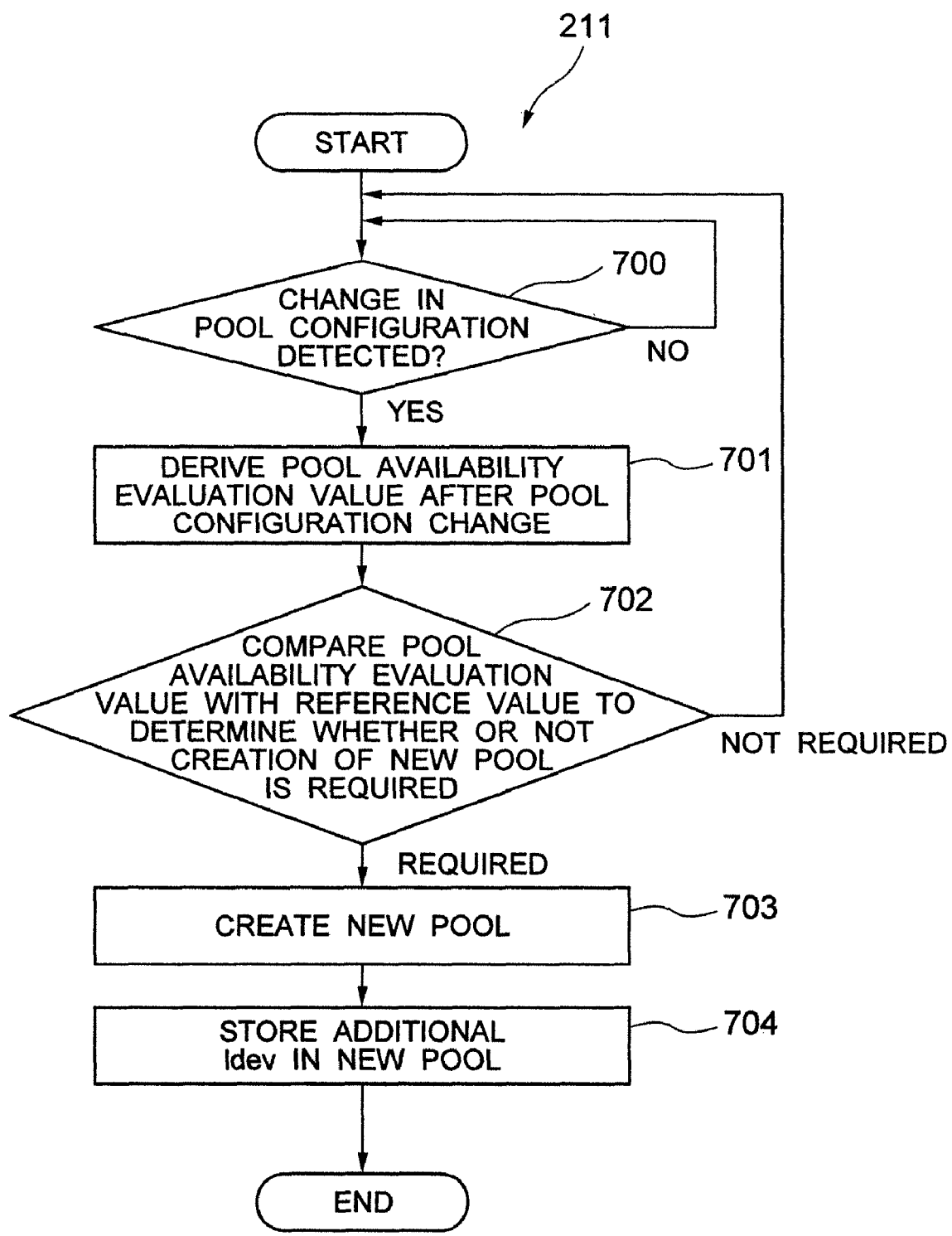
FIG. 7 is a flowchart showing an example of processing to be executed by the managing server of the first embodiment.

FIG. 7 is a flowchart showing an example of a flow of processing to be executed by the control program 211 in the managing server 200 of the first embodiment.

As FIG. 7 shows, the control program 211 first activates the configuration change detection program 212 in step 700. The program 212 confirms presence or absence of a change in the pool configuration of the storage 100 via the service processor 170 of the storage 100. If a change, for example, addition of ldev 113*a* is present, the program 212 notifies the event. If a change in the pool configuration of the storage 100 is detected (yes in step 700), the program 212 proceeds to step 701. Otherwise (no in step 700), the program 212 repeatedly executes processing of step 700.

In step 701, the control program 211 activates the availability evaluation value deriving program 213. The program 213 derives, on the basis of the configuration information 211, the availability evaluation value of the pool after the change in the pool configuration. Later, description will be given in detail of a processing flow to derive the availability evaluation value by referring to FIG. 8.

In step 702, the control program 211 activates the addition necessity determination program 214. The program 214 compares each of the parameters of the pool availability evaluation value derived in step 701 with each of the parameters of the reference value field 222. If any one of the parameters exceeds a reference value, the program 214 determines that a new pool is to be additionally installed (created; required in step 702) and proceeds to step 703. If none of the parameters exceeds an associated reference value, the program 214 determines that a new pool is not to be additionally installed (not required in step 702) and returns to step 700.

In step 703, the control program 211 activates the pool creation program 215. The program 215 indicates creation of a new pool to the service processor 170 of the storage 100.

In step 704, the control program 211 activates the volume adding program 216. The program 216 adds the ldev 113*a* to the pool created in step 703.

FIG. 8 is a flowchart showing an example of a flow of processing in step 701 of FIG. 7.

First, in step 800, the availability evaluation value deriving program 213 obtains each pool volume name 22 of the pool from the pool to pool volume table 223.

Next, in step 801, the program 213 obtains (retrieves) the ldev name 32 of each pool volume from the pool volume to physical resource table 224 and then stores the number thereof in the no. of ldev field 51 of the availability evaluation value table 227.

In step 802, the program 213 obtains the DKA name 34 to be used by each logical device (ldev) from the pool volume from the pool volume to physical resource table 224 and stores the number thereof in the no. of DKA field 52 of the availability evaluation value table 227.

Finally, in step 803, the program 213 obtains the DKA port name 35 to be used by each logical device (ldev) from the pool volume from the pool volume to physical resource table 224 and stores the number thereof in the no. of port field 53 of the availability evaluation value table 227.

Figure 10:
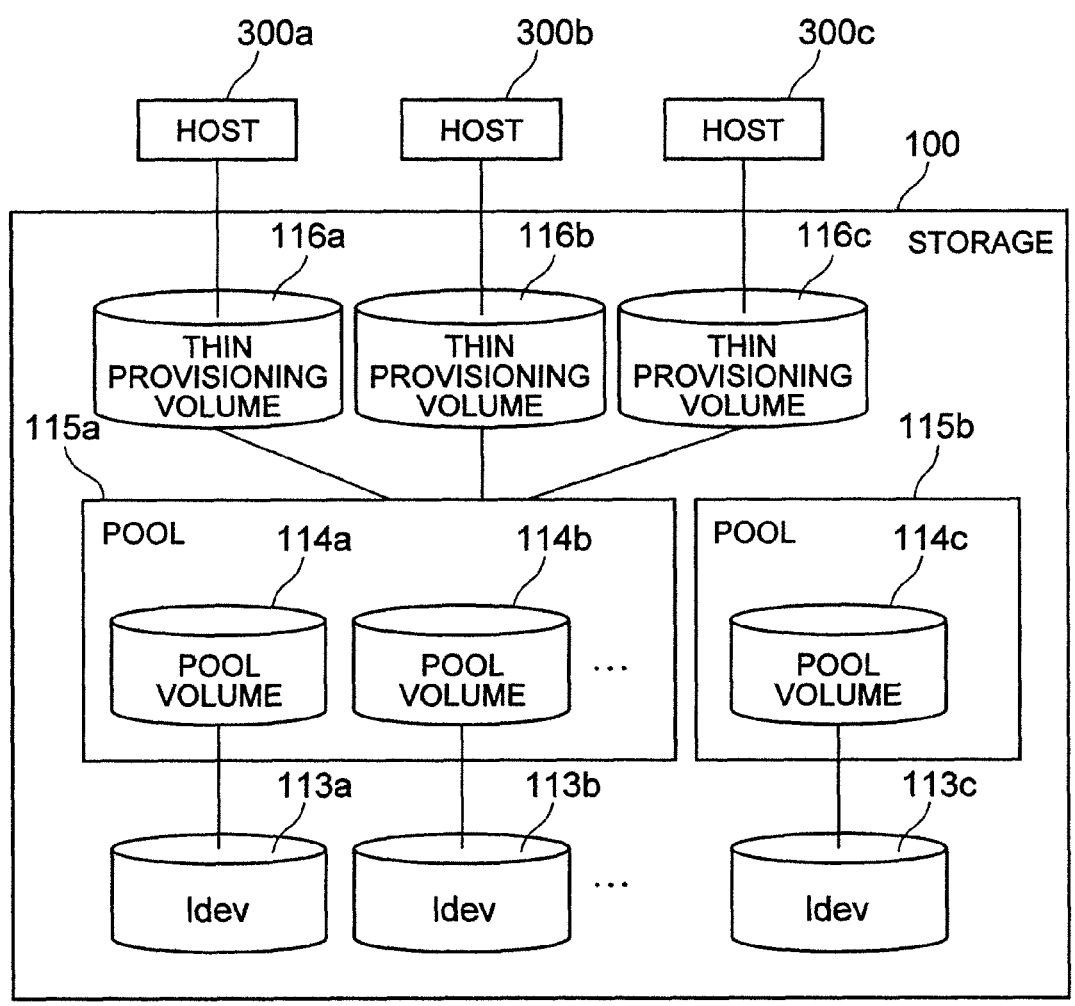
FIG. 10 is a block diagram showing an example of a logical configuration implemented by adding a pool in the first embodiment of a computer system.

For example, assume that when an array group 112*c*, not shown, and the ldev 113*c* are added to the storage 100 due to insufficient remaining capacity of the pool in the first embodiment, each evaluation value of the availability evaluation value table 227 is derived according to the processing flows shown in FIGS. 7 and 8. By comparing each evaluation value of the table 227 with each value of the reference value field 222, it is determined that the number of DKA 52 of the table 227 is more than the number of DKA 42 of the reference value field 222. Hence, it is determined that addition of a pool is required in this situation, and a pool 115*b* is added to the storage 100 as shown in FIG. 10 and the ldev 113*c* is additionally installed for the pool 115*b* in association with the pool volume 114*c*. This leads to suppression of deterioration in the availability of the respective pools 115. FIG. 10 is a diagram showing an example of a logical configuration (corresponding to FIG. 2) when a pool is added.

In addition to the items described for the availability evaluation value table 227 and the reference value field 222, there may be employed items associated with a constituent element on which the pool depends, for example, the number of fibre channel switches 400, the number of ports 10 of the switch 400, the number of cache memories 140, or the number of shared memories 150.

Second Embodiment

Description will now be given of a second embodiment of the present invention by referring to FIGS. 11 to 17. The second embodiment differs from the first embodiment in that the storage system includes an external storage.

Figure 11:
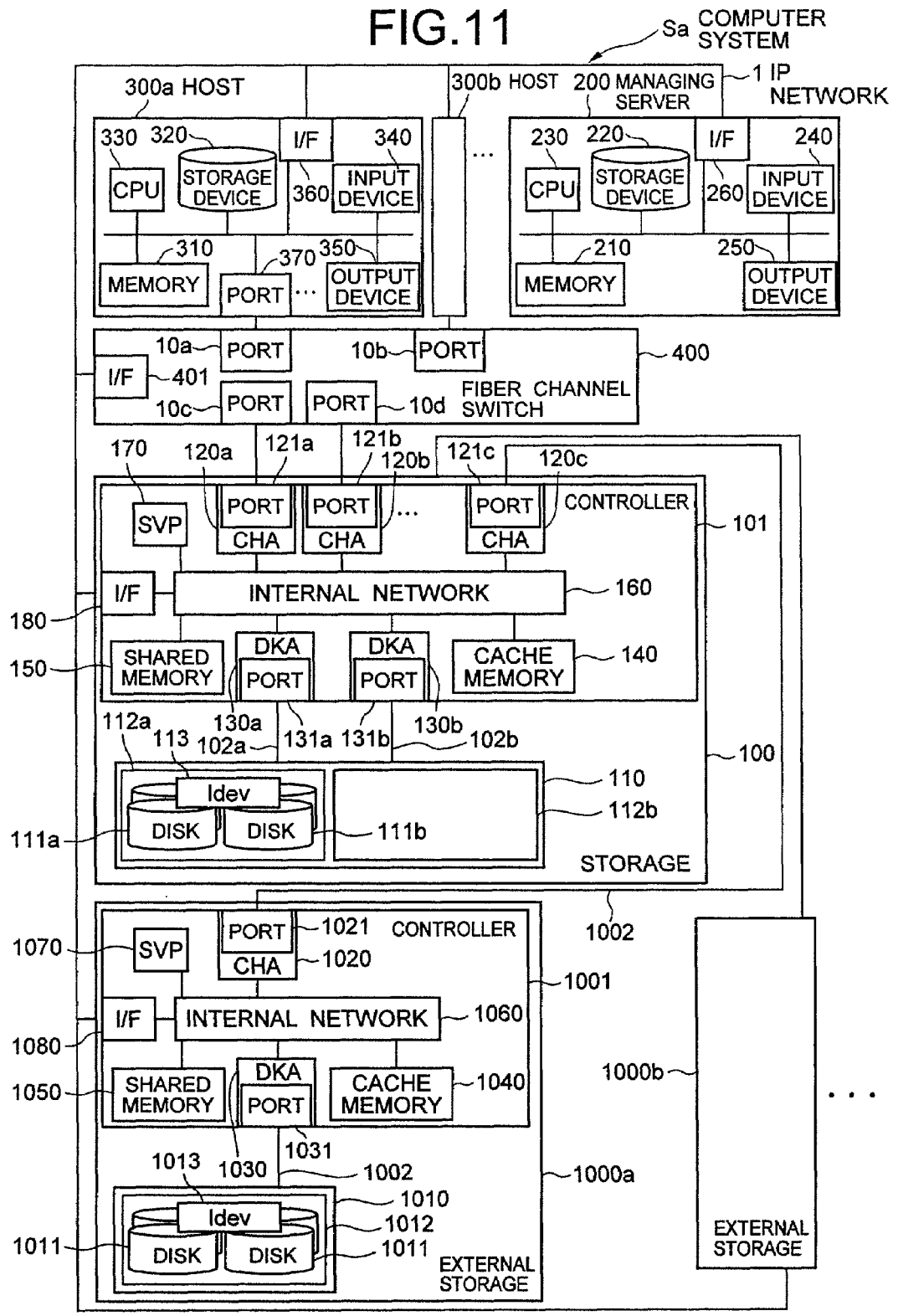
FIG. 11 is a block diagram showing an example of a hardware configuration a computer system in a second embodiment according to the present invention.

FIG. 11 is a block diagram showing an example of a hardware configuration of a computer system Sa (S) in the second embodiment. As compared with the first embodiment (FIG. 1), the second embodiment additionally includes an external storage 1000 and the managing server 200 is modified in the configuration.

First, description will be given of the configuration of the external storage 1000. The storage 1000 may be configured as, for example, a disk array subsystem including a controller 1001 and a storage section 1010.

The controller 1001 controls operation of the external storage 1000 and includes, like the controller 101 described above, a channel adapter (CHA) 1020, a disk adapter (DKA) 1030, a cache memory 1040, a shared memory 1050, an internal network 1060, a service processor (SVP) 1070, and an interface controller (I/F) 1080. The controller 1001 is connected via a port 1031 and a communication network 1002 to the storage section 1010.

The storage section 1010 includes, like the storage section 110, a plurality of disk drives 1011. The disk drives 1011 configure an array group 1012. A logical device (ldev) 1013 is disposed for the array group 1012.

The controller 1001 is connected via a port 1021 to the port 121 of the controller 101 of the storage 100. The communication network 1002 is arranged between the controllers 1001 and 101.

It is also possible that the storage 100 is connected via a plurality of communication networks respectively to the external storages 1000. This makes it possible to distribute communication load and to improve resistivity against failure.

The storage 100 can execute "external storage connection". The execute external storage connection is a technique in which the ldev 1013 of the external storage 1000 is managed as an external device to thereby virtualize the ldev 1013 as a device of the storage 100. One or more external devices which are managed by the storage 100 by use of the external storage connection are directly associated with the ldev 113 of the storage 100.

The external device is independently managed in each storage 100, and the thin provisioning technique is applicable thereto. The external device of the storage 100 can be stored as a pool volume in a pool managed by the storage 100. That is, the ldev 1013 of the storage 1000 can be stored as a pool volume 114 in the pool 115 for management thereof.

Next, description will be given of a software configuration of the managing server 200 in the second embodiment.

Figure 12:
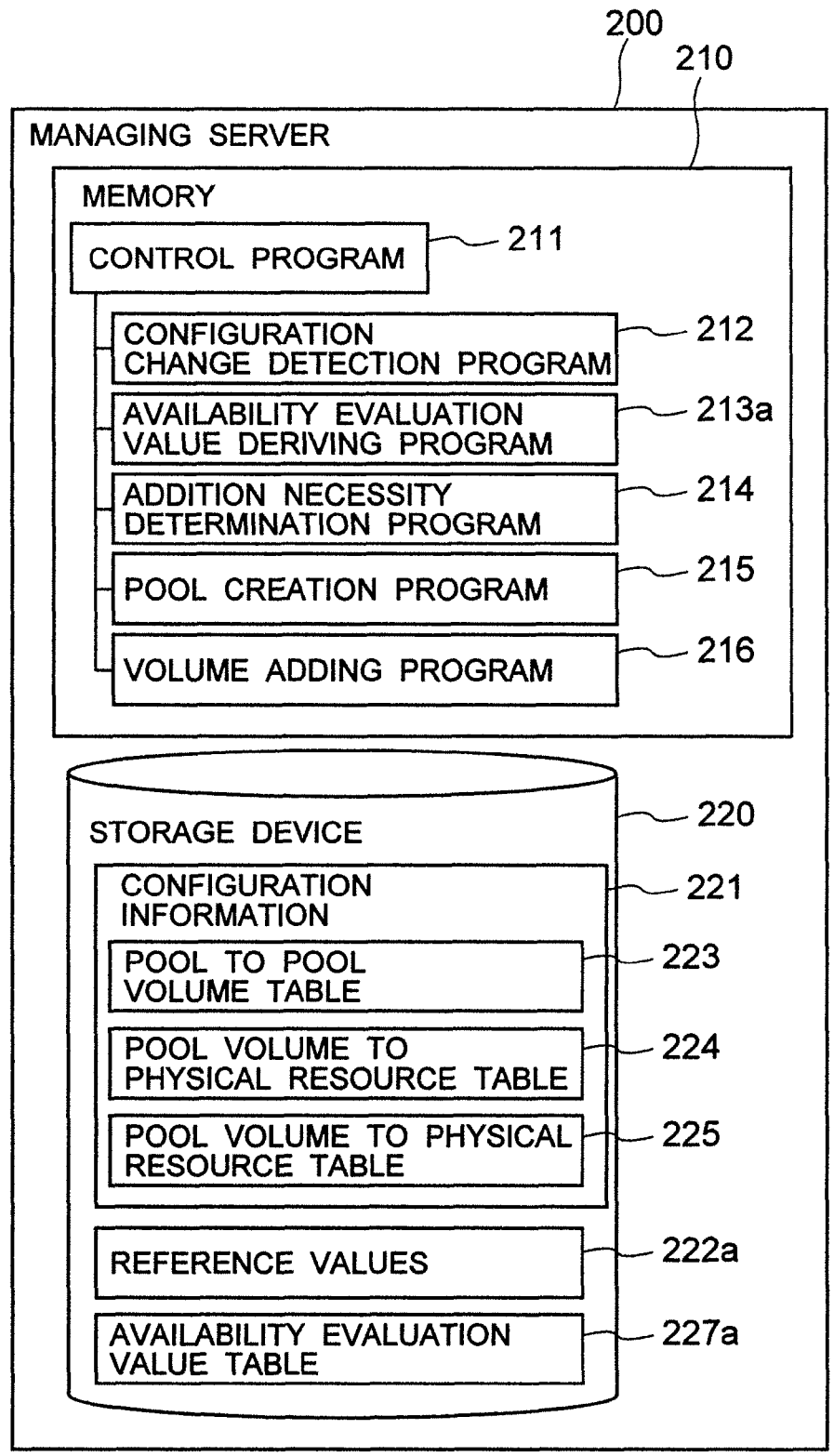
FIG. 12 is a diagram showing an example of configuration information and programs for storage control processing stored in a memory and a storage device of a managing server in the second embodiment.

FIG. 12 is a software configuration diagram showing an example of control information and programs for storage control processing stored in the storage device 220 and the memory 210 of the managing server 200 of the second embodiment.

The managing server 200 of the second embodiment is almost equal in structure to the managing server 200 of the first embodiment (FIG. 3), but the configuration information 221 additionally includes a pool volume to external connection resource table 225 and modifications have been made in an availability evaluation value deriving processing 213*a*, a reference value field 222*a*, and an availability evaluation value table 227*a*.

Description will be given of the pool volume to external connection resource table 225.

FIG. 13 is a diagram to explain an example of the pool volume to external connection resource table 225. For each pool volume, the table 225 keeps therein a set of information items including a pool volume name 61, a logical device (ldev) name 62, an ldev size 63, a disk adapter (DKA) name 64, a DKA port name 65, an array group name 66, an external storage name 67, and a port name on external storage side 68.

The pool volume name 61 stores a value unique in the storage 100 assigned to the pool volume by the service processor 170 of the storage 100.

The ldev name 62 stores a name of the ldev 1013 assigned to the pool volume by the service processor 170.

The ldev size 63 stores information indicating capacity of each ldev 1013 indicated by the ldev name 62.

The DKA name 64 stores a name of the DKA 1030 connected to each array group 1012.

The DKA port name 65 stores a name of the port 1031 of the DKA 1030 connected to the array group 1012.

The array group name 66 stores a name of the array group name 1012 assigned to the array group 1012 by the service processor 170.

The external storage name 67 stores a name of the external storage 1000 having stored the array group 1012 of the pool volume.

The port name on external storage side 68 stores a name of the port 1021 for the connection of the external storage 1000.

Next, the reference value field 222*a* will be described.

Figure 14:
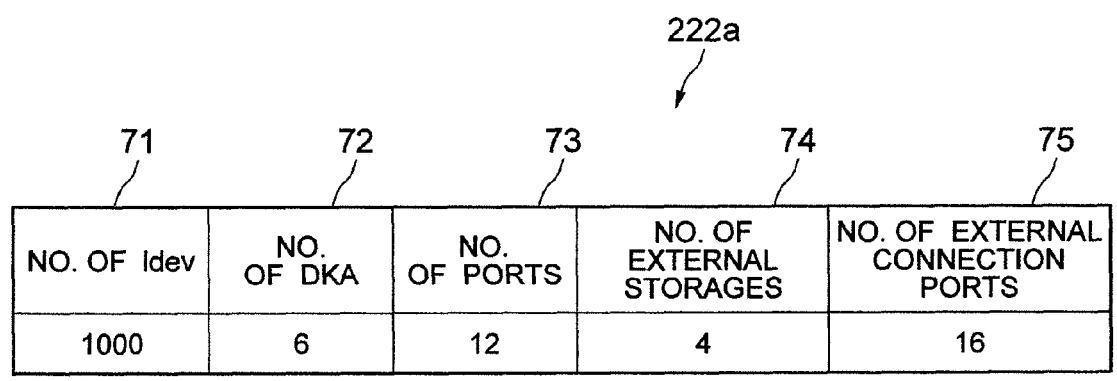
FIG. 14 is a diagram showing an example of reference values of the second embodiment.

FIG. 14 is a diagram to explain an example of the reference value field 222*a*. The field 222*a* keeps, in addition to the items of the reference value field 222, information items including the number of external storages 74 and the number of external connection ports 75.

The number of external storages 74 stores the number of external storages 1000 to be externally connected to the storage 100.

The number of external connection ports 75 stores the number of ports for the connection of the external storages 1000.

It is assumed in the second embodiment that the storage manager sets the respective values of the reference value field 222*a*. However, it is also possible that the storage managing software automatically sets the values of the field 222*a* on the basis of information of failure in the past.

The number of external storages 74 may be obtained by multiplying the number of external storages 74 by a value obtained by dividing the total amount of Input/Output (I/O) data between the storage 100 and the external storage 1000 by the total amount of I/O data between the host 300 and the storage 100. As a result, consideration is given also to the amount of I/O data possibly affecting the availability, and hence the availability can be evaluated with higher precision.

Description will next be given of the availability evaluation value table 227.

FIG. 17 is a diagram showing an example of the availability evaluation value table 227a. The table 227a keeps, for each pool, a set of information items including the number of logical devices (ldev) 81, the number of disk adapters (DKA) 82, the number of ports 83, the number of external storages 84, and the number of external connection ports 85. These items will be described later in detail by referring to FIG. 16.

Figure 15:
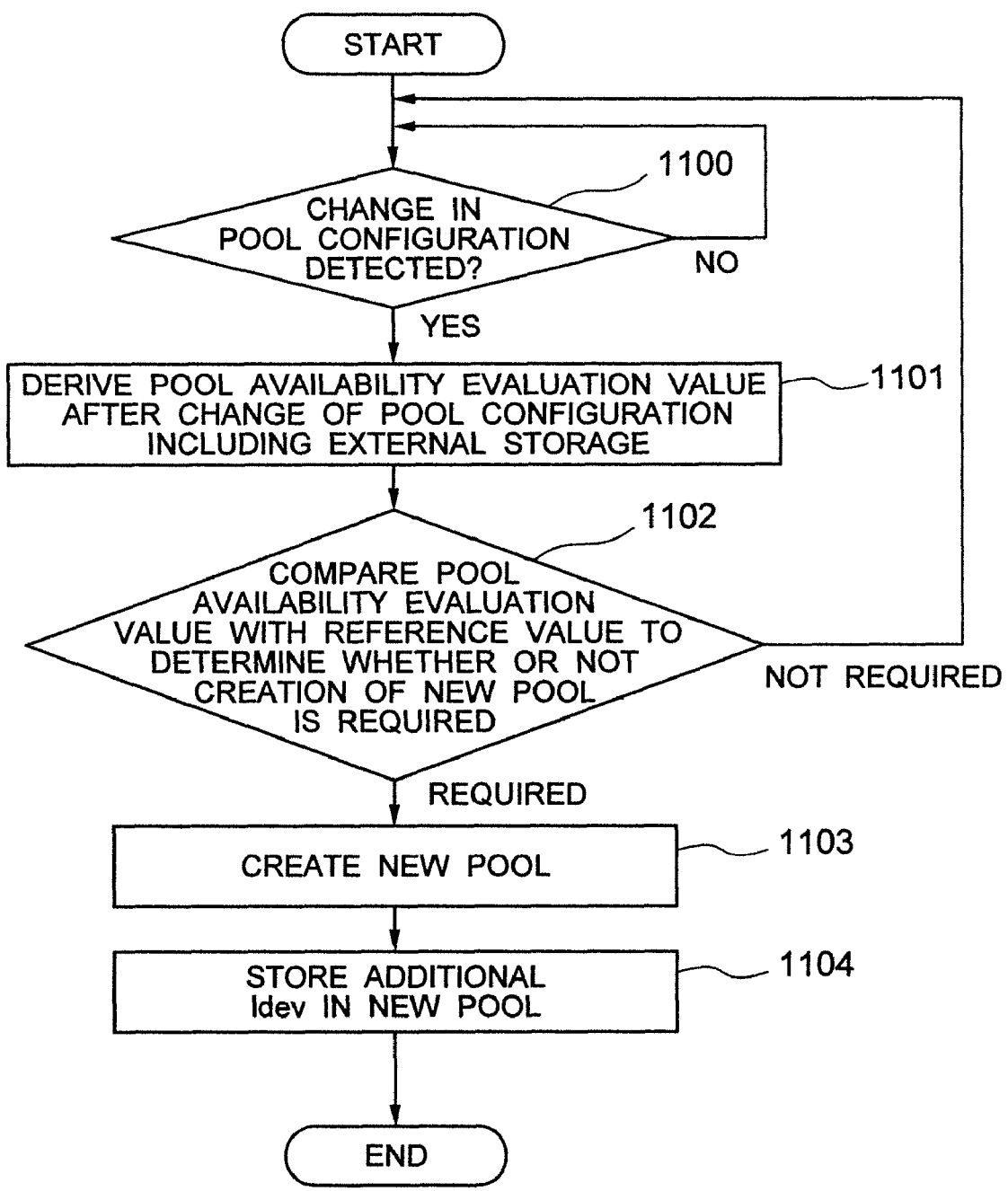
FIG. 15 is a flowchart showing an example of processing to be executed by the managing server of the second embodiment.

FIG. 15 is a flowchart showing an example of a processing flow of the control program 211 to be executed by the managing server 200 of the second embodiment.

The control program 211 first activates the configuration change detection program 212 in step 1100. The program 212 confirms presence or absence of a change in the pool configuration of the storage 100 via the service processor 170 of the storage 100. If a change, for example, addition of ldev 113a or 1013a is present, the program 212 notifies the event. If a change in the pool configuration of the storage 100 is detected (yes in step 1100), the program 212 proceeds to step 1101. Otherwise (no in step 1100), the program 212 repeatedly executes processing of step 1100.

In step 1101, the control program 211 activates the availability evaluation value deriving program 213a. The program 213a derives, on the basis of the configuration information 211, the availability evaluation value of the pool after the change in the pool configuration including the external storage 1000. Later, description will be given in detail of a processing flow to derive the availability evaluation value by referring to FIG. 16.

In step 1102, the control program 211 activates the addition necessity determination program 214. The program 214 compares each of the parameters of the pool availability evaluation value derived in step 1101 with each of the parameters of the reference value field 222. If any one of the parameters exceeds an associated reference value, the program 214 determines that a new pool is to be additionally installed (created; required in step 1102) and proceeds to step 1103. If none of the parameters exceeds an associated reference value, the program 214 determines that a new pool is not to be additionally installed (not required in step 1102) and returns to step 1100.

Next, in step 1103, the control program 211 activates the pool creation program 215. The program 215 indicates creation of a new pool to the service processor 170 of the storage 100.

In step 1104 thereafter, the control program 211 activates the volume adding program 216. The program 216 adds the ldev 113a or 1013a to the pool created in step 1103.

Figure 16:
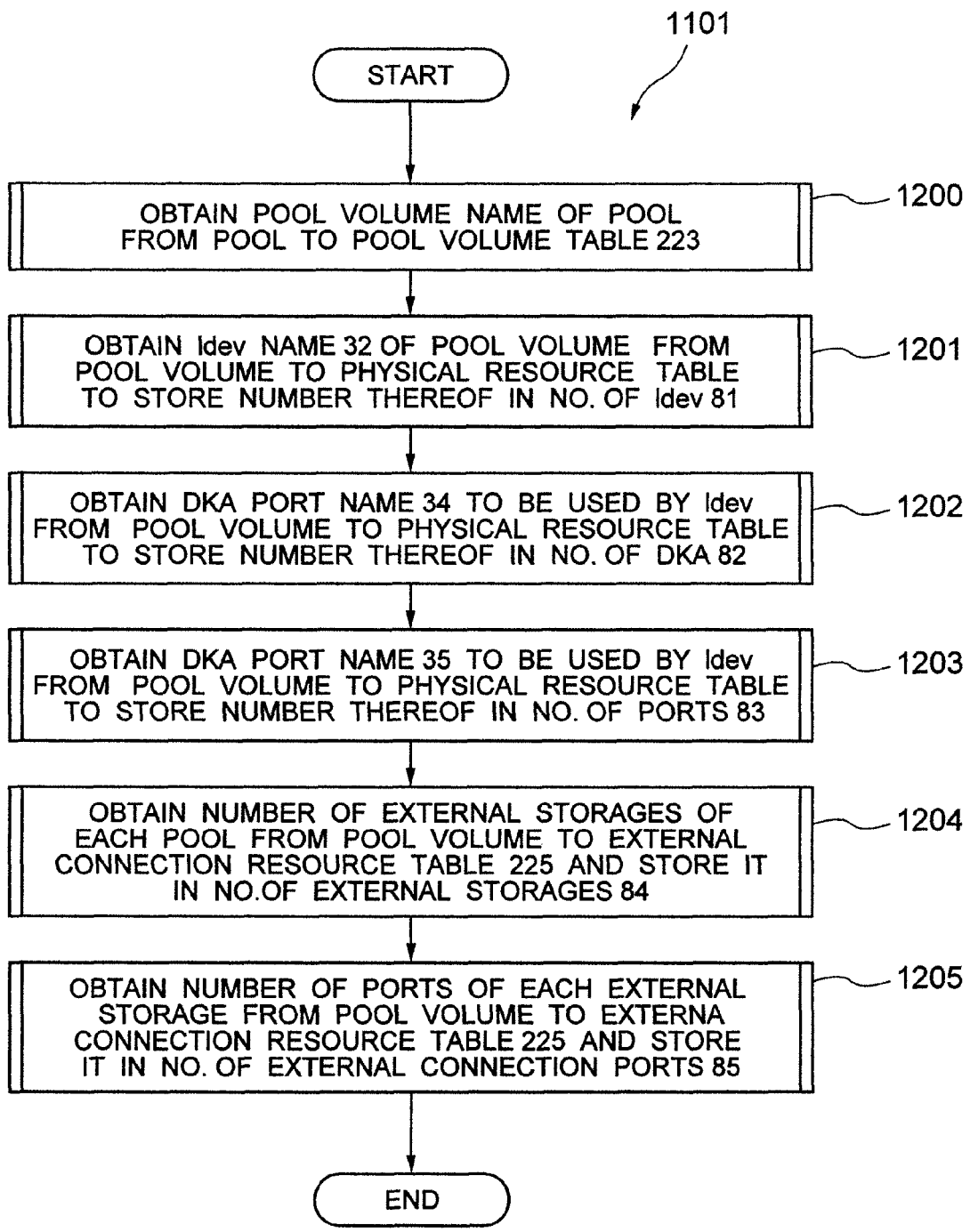
FIG. 16 is a flowchart showing an example of processing to be executed by the managing server of the second embodiment to derive an availability evaluation value.

FIG. 16 is a flowchart showing an example of a flow of processing in step 1101 of FIG. 15.

First, in step 1200, the availability evaluation value deriving program 213a obtains each pool volume name 22 of the pool from the pool to pool volume table 223.

Next, in step 1201, the program 2131 obtains (retrieves) the ldev name 32 of each pool volume from the pool volume to physical resource table 224 and then stores the number thereof in the no. of ldev field 81 of the availability evaluation value table 227a.

In step 1202, the program 213a obtains the DKA name 34 to be used by each logical device (ldev) from the pool volume to physical resource table 224 and stores the number thereof in the no. of DKA field 82 of the availability evaluation value table 227a.

Next, in step 1203, the program 213a obtains the DKA port name 35 to be used by each logical device (ldev) from the pool volume to physical resource table 224 and stores the number thereof in the no. of port field 83 of the availability evaluation value table 227a.

In step 1204, the program 213a obtains or retrieves the number of external storages 1000 of each pool from the pool volume to external connection resource table 225 and stores the number thereof in the no. of external storage field 84 of the availability evaluation value table 227a.

Finally, in step 1205, the program 213a obtains the number of ports 1021 of each external storage 1000 from the pool volume to external connection resource table 225 and stores the number thereof in the no. of external connection port field 85 of the availability evaluation value table 227a.

For example, assume that when an external storage 1000 is added (connected) to the storage 100 due to insufficient remaining capacity of the pool in the second embodiment, each evaluation value of the availability evaluation value table 227a is derived according to the processing flows shown in FIGS. 15 and 16. By comparing the table 227a with the reference value field 222a, it is determined that the number of external storages 84 of the table 227a is more than the number of external storages 74 of the reference value field 222a. Hence, as in the case of FIG. 10 of the first embodiment, it is determined that addition of a pool is required in this situation, and a pool is added to the storage 100 and the ldev 1013 is additionally installed as a pool volume in the pool 115. This leads to suppression of deterioration in the availability.

It is also possible that the device configuring the pool 115 as in the storage 100 of the second embodiment does not includes therein physical devices such as the storage sections 110 for physical storage areas, but includes only the controller 101, and the physical storage areas are externally arranged.

Third Embodiment

Description will be given of a third embodiment of the present invention by referring to FIGS. 18 to 22.

In the second embodiment, it is likely that a new pool is frequently added to the storage 100 as the areas of the storage 100 used by the host 300 increases. This leads to a problem of a long period of time required for the addition of pools (e.g., processing time). To cope with the problem, there is predicted in the third embodiment a configuration of pools in a situation wherein data is stored in the pools up to the total of the virtual sizes of the thin provisioning volumes to resultantly derive the pool availability evaluation value. By determining necessity of addition of a pool based on the evaluation value, it is possible to avoid an event of addition of a pool even if data is stored in the pools up to the virtual sizes of the thin provisioning volumes.

The computer system of the third embodiment is similar in the hardware configuration to that of the first embodiment shown in FIG. 1, but the software configuration of the managing server 200 has been modified.

Figure 18:
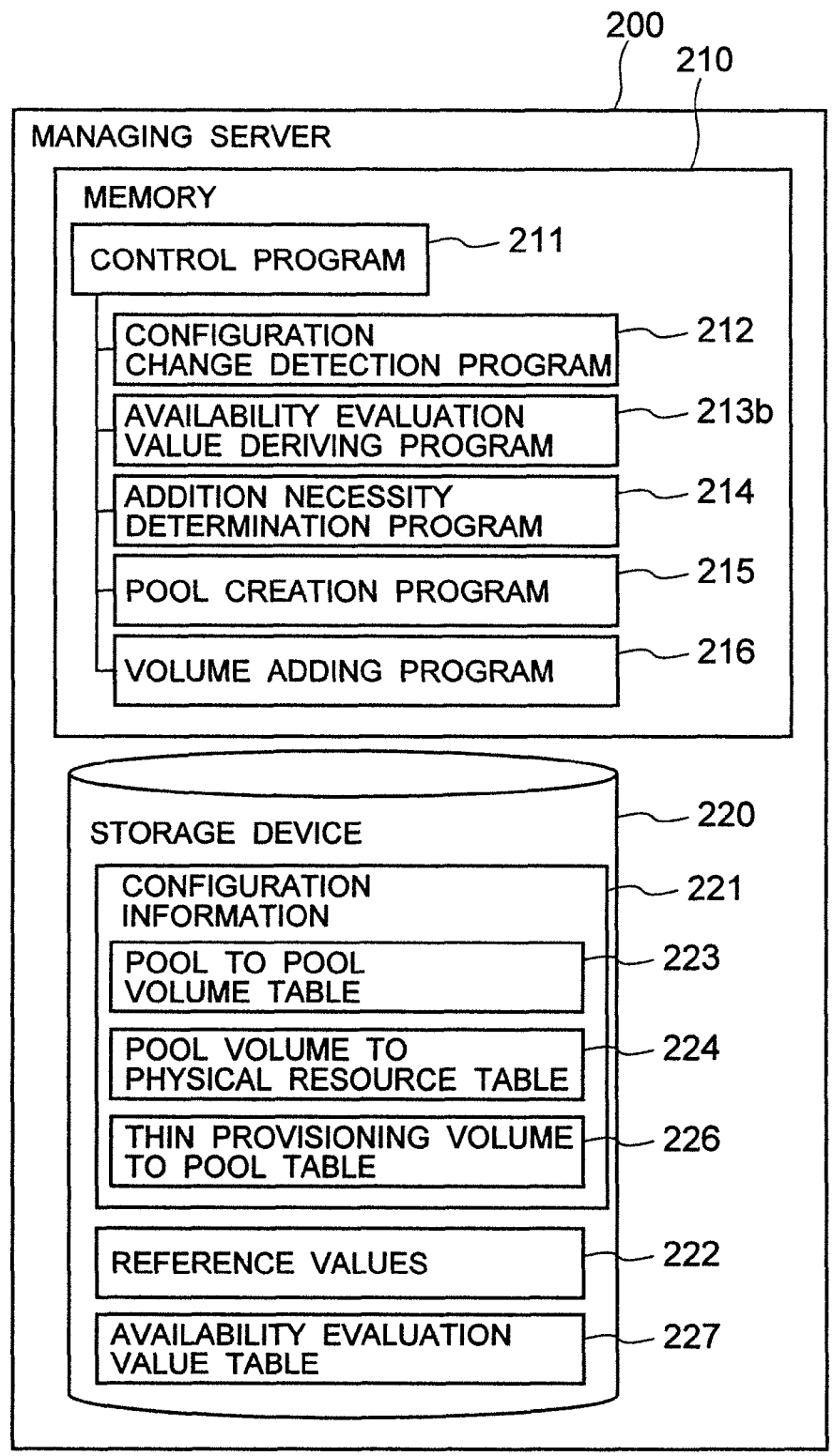
FIG. 18 is a diagram showing an example of configuration information and programs for storage control processing stored in a memory and a storage device of a managing server in the third embodiment.

Description will now be given of the managing server 200. FIG. 18 is a software configuration diagram showing an example of the managing server 200 of the third embodiment. The managing server 200 is substantially equal to that of the first embodiment shown in FIG. 3, but the configuration information 221 additionally includes a thin provisioning volume to pool table 226.

Description will next be given of the thin provisioning volume to pool table 226.

FIG. 19 is a diagram showing an example of the thin provisioning volume to pool table 226. In the table 226, each record keeps a set of information items, i.e., a pool name 91, a thin provisioning volume name 92, a virtual capacity 93, and a used capacity 94.

The pool name 91 stores a name assigned to the pool by the service processor 170 to identify the pool. The pool name 91 may be any value, e.g., a character string to uniquely identify the pool.

The thin provisioning volume name 92 stores a name assigned to a thin provisioning volume by the service processor 170 to identify the volume provided to each host 300.

The virtual capacity 93 stores information indicating a virtual capacity of each associated thin provisioning volume.

The used capacity 94 stores a data capacity actually used in the thin provisioning volume.

Figure 20:
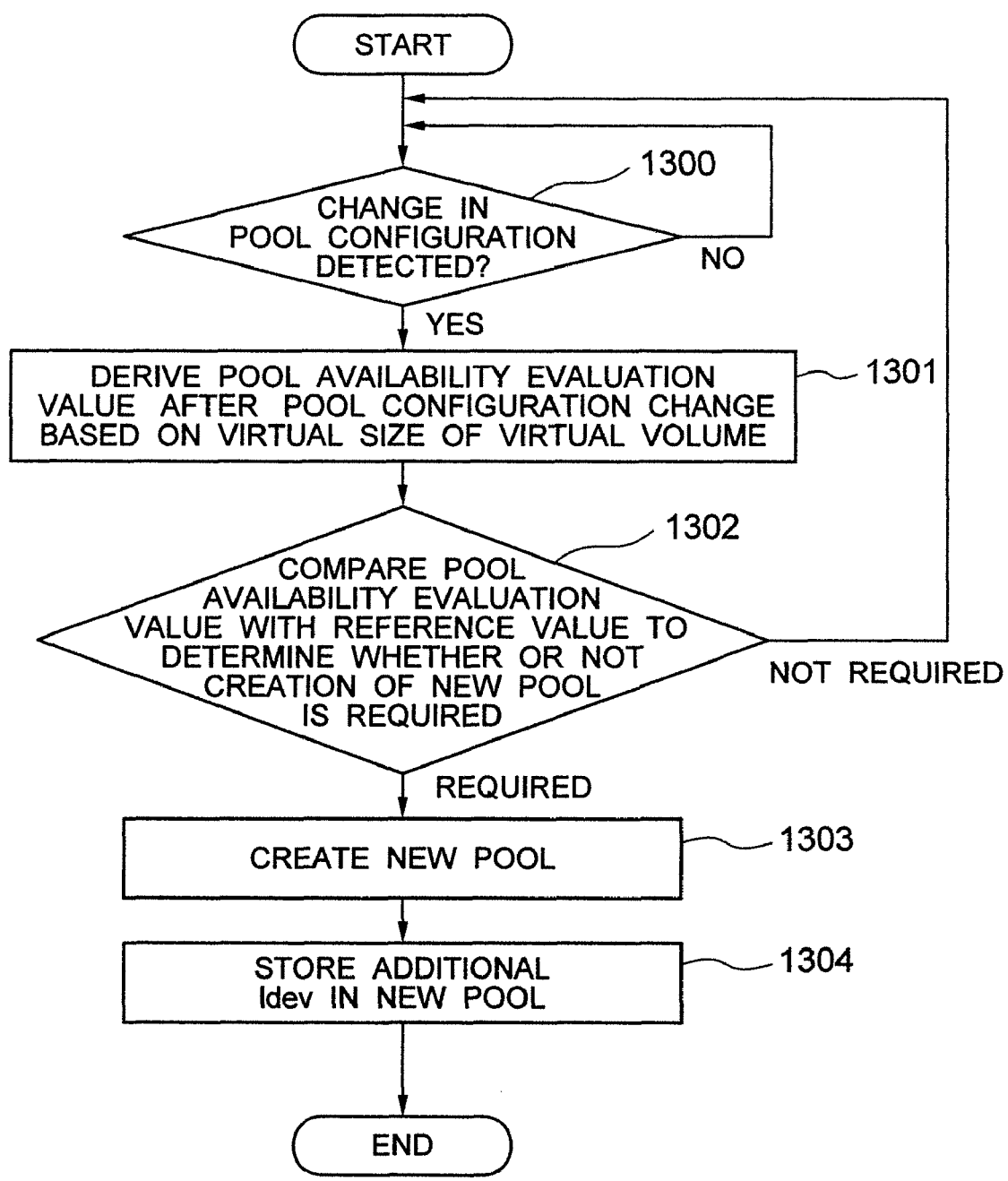
FIG. 20 is a flowchart showing an example of processing to be executed by the managing server of the third embodiment.

FIG. 20 is a flowchart showing an example of a processing flow of the control program 211 to be executed by the managing server 200 of the third embodiment.

In step 1300, the control program 211 activates the configuration change detection program 212. The program 212 confirms presence or absence of a change in the pool configuration of the storage 100 via the service processor 170 of the storage 100. If a change, for example, addition of ldev 113a is present, the program 212 notifies the event. If a change in the pool configuration of the storage 100 is detected (yes in step 1300), the program 212 proceeds to step 1301. Otherwise (no in step 1300), the program 212 repeatedly executes processing of step 1300.

In step 1301, the control program 211 activates the availability evaluation value deriving program 213a. The program 213a derives, on the basis of items such as the virtual capacity 93 (the virtual size of the virtual volume) of the thin provisioning volume to pool table 226, the availability evaluation value of the pool after the change in the pool configuration. Later, description will be given in detail of a processing flow to derive the availability evaluation value by referring to FIG. 21.

In step 1302, the control program 211 activates the addition necessity determination program 214. The program 214 compares each of the parameters (which will be described later by referring to FIG. 22) of the pool availability evaluation value derived in step 1301 with each of the parameters of the reference value field 222. If any one of the parameters exceeds an associated reference value, the program 214 determines that a new pool is to be additionally installed (created; required in step 1302) and proceeds to step 1303. If none of the parameters exceeds an associated reference value, the program 214 determines that a new pool is not to be additionally installed (not required in step 1302) and returns to step 1300.

In step 1303, the control program 211 activates the pool creation program 215. The program 215 indicates creation of a new pool to the service processor 170 of the storage 100.

In step 1304 thereafter, the control program 211 activates the volume adding program 216. The program 216 adds the ldev 113a to the pool created in step 1303.

Figure 21:
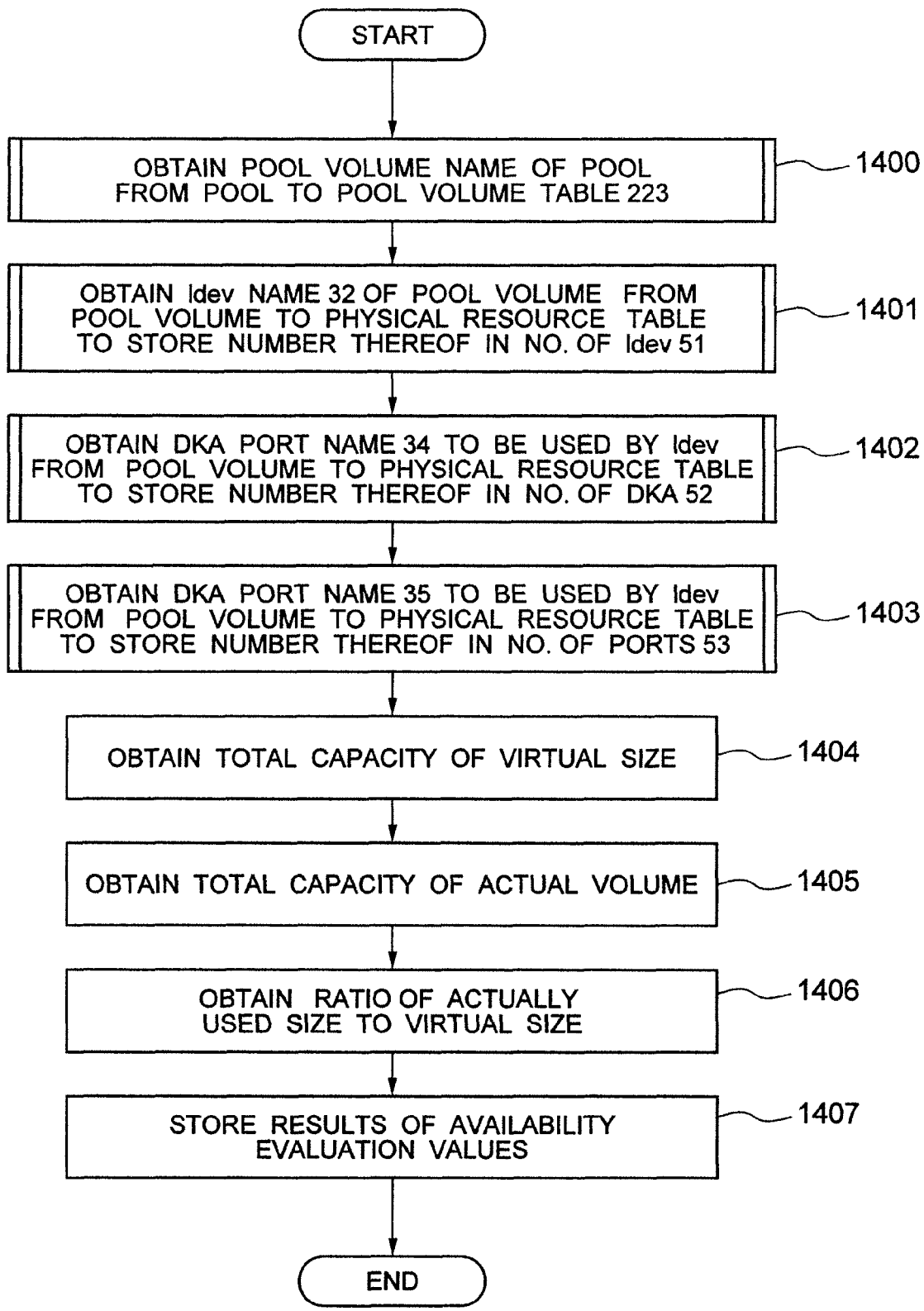
FIG. 21 is a flowchart showing an example of processing to be executed by the managing server of the third embodiment to derive an availability evaluation value.

FIG. 21 is a flowchart showing an example of a flow of processing in step 1301 of FIG. 7.

In step 1400, the availability evaluation value deriving program 213b obtains each pool volume name 22 of the pool from the pool to pool volume table 223.

In step 1401, the program 213b obtains (retrieves) the ldev name 32 of each pool volume from the pool volume to physical resource table 224 and then stores the number thereof in the no. of ldev field 51 of the availability evaluation value table 227, which will be described later by referring to (a) of FIG. 22.

In step 1402, the program 213b obtains (retrieves) the DKA name 34 to be used by each logical device (ldev) from the pool volume to physical resource table 224 and stores the number thereof in the no. of DKA field 52 of the availability evaluation value table 227 ((a) of FIG. 22).

In step 1403, the program 213b obtains (retrieves) the DKA port name 35 to be used by each logical device (ldev) from the pool volume to physical resource table 224 and stores the number thereof in the no. of port field 53 of the availability evaluation value table 227 ((a) of FIG. 22).

Next, in step 1404, the program 213b obtains the total capacity of the virtual sizes assigned to the thin provisioning volumes of each associated pool on the basis of the virtual capacity 93 (virtual size) in the thin provisioning volume to pool table 226.

In step 1405, the program 213b obtains the total used capacity (total capacity) by adding to each other the capacity values actually used by the thin provisioning volumes of each pool on the basis of the used capacity 94 of the thin provisioning volume to pool table 226.

In step 1406, the program 213b obtains a ratio of the actually used size to the virtual size by dividing the value obtained in step 1405 by the value obtained in step 1404.

Finally, the program 213b multiplies each of the evaluation values of the availability evaluation value table 227 by the value obtained in step 1406.

FIG. 22 shows an example of results obtained by executing the processing of FIGS. 20 and 21 when the thin provisioning volume to pool table 226 is as shown in FIG. 19. After steps 1400 to 1402 of FIG. 21 are executed, the pool availability evaluation values are obtained as shown in (a) of FIG. 22. The value calculated in step 1406 is 300 terabytes and that calculated in step 1405 is 100 terabytes, and hence the ratio of actual size to the virtual size calculated in step 1406 is three. Therefore, by multiplying each value of the availability evaluation value table 227 by three, there are obtained the values of the table 227 shown in (b) of FIG. 22.

Availability of the first or second embodiment will be evaluated by use of the values shown in the table 227 of (b) of FIG. 22. Since the availability evaluation value is calculated by beforehand predicting a configuration of the pool when data is stored up to the total size of the virtual sizes of the thin provisioning volumes, the addition of a new pool is not required even if the used capacity of the storage 100 is increased as a result of use of storage areas by the host 300. It is hence possible to avoid the problem of the long period of time required for the installation of an additional pool (e.g., processing time).

As above, according to the first to third embodiments, even when the virtual storage capacity of pools is increased in the computer system S, it is possible to keep the availability of each pool at least at a desired level.

Description has been given of the first to third embodiments, but the present invention is not restricted by these embodiments. For example, the timing to determine necessity of addition of a new pool may be other than the timing immediately after detection of a change in the pool configuration, but may be periodic timing or any other appropriate timing. The specific configurations of the hardware, the software, and the programs may be changed or modified without departing from the scope and spirit of the present invention.

The invention claimed is:

1. A managing server for managing a storage apparatus comprising a plurality of storage devices and a controller connected via a communication path to a host computer for controlling input and output operations of data for each of the storage devices in response to a request from the host computer, wherein:

the storage apparatus comprises:
   at least one virtual volume to be accessed by the host computer, and
   at least one pool assigned to the virtual volume, the pool being a set of logical volumes as virtual storage areas corresponding to the plural storage devices; and
the managing server compares a reference value beforehand stored therein with an evaluation value of availability which represents a degree of resistivity against destruction, the degree being derived by use of physical configuration information which is obtained from the controller and which is associated with the pool; and determines necessity of addition of an element to the pool if the availability evaluation value exceeds the reference value and indicates the addition of the element to the pool to the storage apparatus,
wherein the availability evaluation value includes a parameter on the basis of the number of physical constituent components of the pool,
wherein the parameter includes at least either one of the number of disk adapters of the controller of the storage apparatus for controlling data communication with the plural disk devices, the number of ports for communication of each of the disk adapters, and the number of the logical volumes,
wherein the availability evaluation value includes a plurality of the parameters, and
wherein the managing server determines necessity of addition of an element to the pool if at least one of the parameters exceeds the reference value associated therewith.

2. A managing server according to claim 1, wherein the managing server sets the reference value on the basis of information of a physical configuration of the pool at failure in the past at which the virtual volume becomes unavailable.

3. A managing server according to claim 1, wherein:
   the pool of the storage apparatus includes a logical volume in an external storage apparatus connected to the storage apparatus; and
   the reference value includes information regarding a physical configuration of the external storage apparatus.

4. A managing server according to claim 3, wherein the availability evaluation value includes a parameter on the basis of an input/output data amount between the storage apparatus and the external storage apparatus.

5. A managing server according to claim 1, wherein the managing server predicts information of a configuration of the pool when data is stored in the pool up to a total capacity of the virtual volume; derives the pool availability evaluation value using the information of a configuration of the pool thus predicted; comparing the pool availability evaluation value with the reference value; and determines necessity of addition of an element to the pool if the availability evaluation value exceeds the reference value and indicates the addition of the element to the pool to the storage apparatus.

6. A pool adding method for use with a managing server for managing a storage apparatus comprising a plurality of storage devices and a controller connected via a communication path to a host computer for controlling input and output operations of data for each of the storage devices in response to a request from the host computer,
   at least one virtual volume to be accessed by the host computer, and
   at least one pool assigned to the virtual volume, the pool being a set of logical volumes as virtual storage areas corresponding to the plural storage devices;
wherein the method comprises:
   comparing, by the managing server, a reference value beforehand stored therein with an evaluation value of availability which represents a degree of resistivity against destruction, the degree being derived by use of physical configuration information which is obtained from the controller and which is associated with the pool; and determines necessity of addition of an element to the pool if the availability evaluation value exceeds the reference value and indicates the addition of the element to the pool to the storage apparatus,
wherein the availability evaluation value includes a parameter on the basis of the number of physical constituent components of the pool,
wherein the parameter includes at least either one of the number of disk adapters of the controller of the storage apparatus for controlling data communication with the plural disk devices, the number of ports for communication of each of the disk adapters, and the number of the logical volumes,
wherein the availability evaluation value includes a plurality of the parameters, and
wherein the managing server determines necessity of addition of an element to the pool if at least one of the parameters exceeds the reference value associated therewith.

7. A pool adding method according to claim 6, wherein the managing server sets the reference value on the basis of information of a physical configuration of the pool at failure in the past at which the virtual volume becomes unavailable.

8. A pool adding method according to claim 6, wherein:
   the pool of the storage apparatus includes a logical volume in an external storage apparatus connected to the storage apparatus; and
   the reference value includes information regarding a physical configuration of the external storage apparatus.

9. A pool adding method according to claim 8, wherein the availability evaluation value includes a parameter on the basis of an input/output data amount between the storage apparatus and the external storage apparatus.

10. A pool adding method according to claim 6, wherein the managing server predicts information of a configuration of the pool when data is stored in the pool up to a total capacity of the virtual volume; derives the pool availability evaluation value using the information of a configuration of the pool thus predicted; comparing the pool availability evaluation value with the reference value; and determines necessity of addition of an element to the pool if the availability evaluation value exceeds the reference value and indicates the addition of the element to the pool to the storage apparatus.

11. A computer system, comprising:
   a storage apparatus comprising a plurality of storage devices and a controller connected via a communication path to a host computer for controlling input and output operations of data for each of the storage devices in response to a request from the host computer; and
   a managing server for managing the storage apparatus, wherein:
   the storage apparatus comprises:
   at least one virtual volume to be accessed by the host computer, and
   at least one pool assigned to the virtual volume, the pool being a set of logical volumes as virtual storage areas corresponding to the plural storage devices; and the managing server compares a reference value beforehand stored therein with an evaluation value of availability which represents a degree of resistivity against destruction, the degree being derived by use of physical configuration information which is obtained from the controller and which is associated with the pool; and determines necessity of addition of an element to the pool if the availability evaluation value exceeds the reference value and indicates the addition of the element to the pool to the storage apparatus, wherein the availability evaluation value includes a parameter on the basis of the number of physical constituent components of the pool wherein the parameter includes at least either one of the number of disk adapters of the controller of the storage apparatus for controlling data communication with the plural disk devices, the number of ports for communication of each of the disk adapters, and the number of the logical volumes, wherein the availability evaluation value includes a plurality of the parameters, and wherein the managing server determines necessity of addition of an element to the pool if at least one of the parameters exceeds the reference value associated therewith.

* * * * *